United States Patent [19]

Sakaue

[11] Patent Number: 5,276,850
[45] Date of Patent: Jan. 4, 1994

[54] INFORMATION PROCESSING APPARATUS WITH CACHE MEMORY AND A PROCESSOR WHICH GENERATES A DATA BLOCK ADDRESS AND A PLURALITY OF DATA SUBBLOCK ADDRESSES SIMULTANEOUSLY

[75] Inventor: Kenji Sakaue, Yokohama, Japan

[73] Assignee: Kabushiki Kaisha Toshiba, Kawasaki, Japan

[21] Appl. No.: 968,464

[22] Filed: Oct. 29, 1992

Related U.S. Application Data

[63] Continuation of Ser. No. 455,151, Dec. 22, 1989, abandoned.

[30] Foreign Application Priority Data

Dec. 27, 1988 [JP] Japan .................. 63-330149

[51] Int. Cl.⁵ ............................................... G06F 12/02
[52] U.S. Cl. ..................... 395/425; 364/DIG. 1; 364/243.4; 364/254.3; 364/244.8
[58] Field of Search ................. 395/450, 425; 364/200

[56] References Cited

U.S. PATENT DOCUMENTS

| | | |
|---|---|---|
| 4,646,233 | 2/1987 | Weatherford . |
| 4,691,281 | 9/1987 | Furui .................... 395/400 |
| 4,792,917 | 12/1988 | Takamatsu et al. .......... 395/425 |
| 4,807,124 | 2/1989 | Mor et al. ................ 395/400 |
| 4,897,783 | 1/1990 | Nay ...................... 364/200 |
| 5,056,002 | 10/1991 | Watanabe ................. 395/425 |
| 5,095,527 | 3/1992 | Uramoto et al. ........... 395/800 |

FOREIGN PATENT DOCUMENTS 0279189 8/1988 European Pat. Off. .
8504737 10/1985 PCT Int'l Appl. .

OTHER PUBLICATIONS

IBM Technical Disclosure Bulletin, vol. 23, No. 7B, Dec. 1980, pp. 3461-3463; J. Yamour.

Primary Examiner—Joseph L. Dixon
Assistant Examiner—Hiep T. Nguyen
Attorney, Agent, or Firm—Oblon, Spivak, McClelland, Maier & Neustadt

[57] ABSTRACT

An information processing apparatus which includes a main memory for storing a plurality of data blocks each having a predetermined size stores a plurality of data blocks. Each data block includes a plurality of words, and each word includes a plurality of byte data. A data memory section in a cache memory for storing a small amount of data as compared with that of the main memory to achieve high-speed processing transfers data from/to the main memory in units of data blocks. A microprocessor generates a request address including desired data block and word addresses in order to access a plurality of desired words in a desired data block in the data memory section. A comparator determines whether a data block corresponding to the data block address is present in the data memory section. The microprocessor reads a plurality of words corresponding to the word address in the plurality of words in the corresponding data block from the data memory section in response to an output from the comparator.

16 Claims, 6 Drawing Sheets

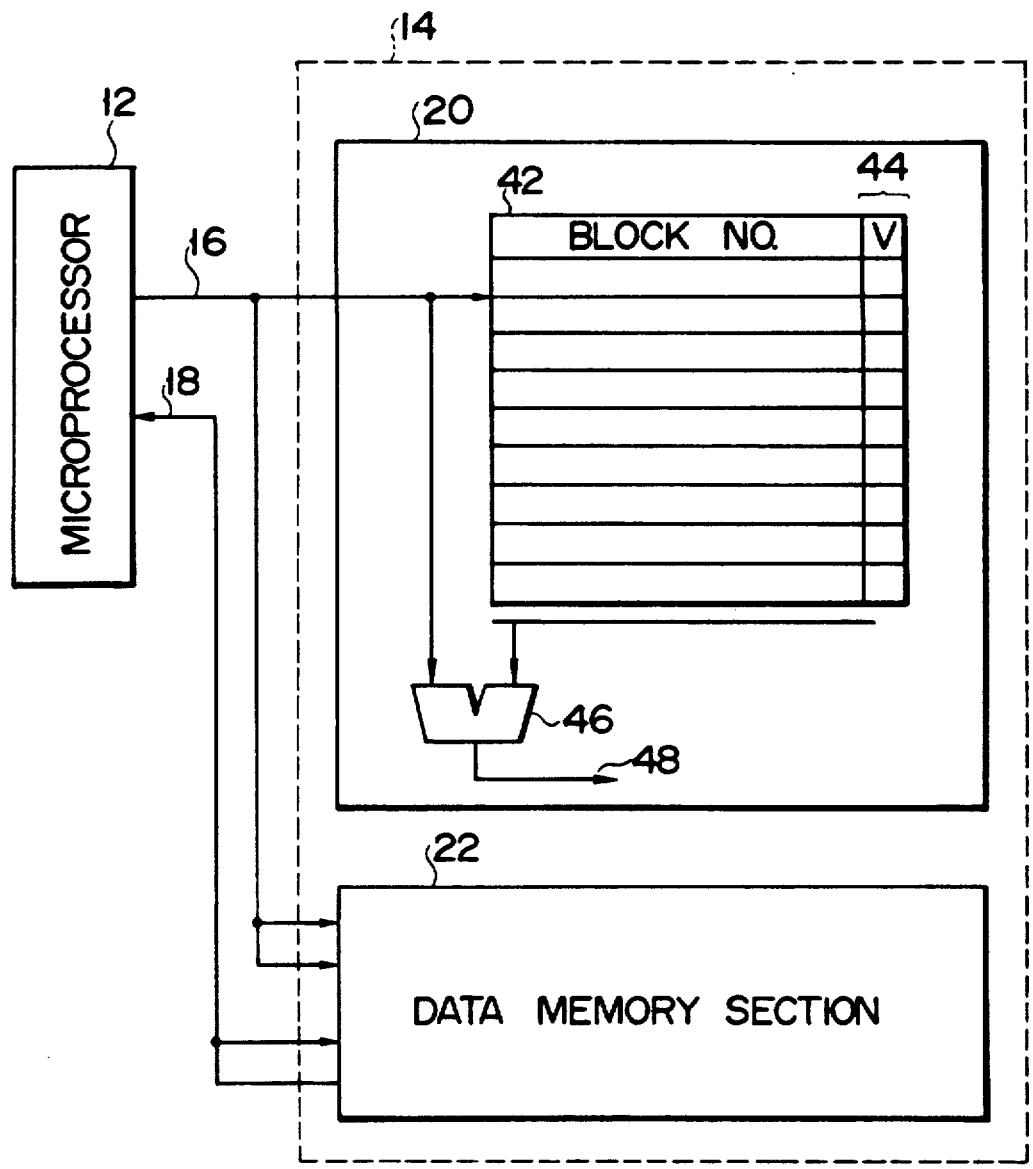
F I G. 2

INFORMATION PROCESSING APPARATUS WITH CACHE MEMORY AND A PROCESSOR WHICH GENERATES A DATA BLOCK ADDRESS AND A PLURALITY OF DATA SUBBLOCK ADDRESSES SIMULTANEOUSLY

This application is a continuation of application Ser. No. 07/455,151, filed on Dec. 22, 1989, now abandoned.

BACKGROUND OF THE INVENTION

1. Field of the Invention

The present invention generally relates to an information processing apparatus and, more particularly, to an information processing apparatus with a cache memory.

2. Description of the Related Art

An information processing apparatus such as a computer or a word processor often includes a main memory with a relatively large capacity divided into a plurality of blocks each having a predetermined size, and a cache memory, with a capacity smaller than that of the main memory, for achieving high-speed processing. In such an information processing apparatus, the memory contents are stored in the cache memory from the main memory in units of blocks divided to each have a predetermined size, and are returned from the cache memory to the main memory. If the cache memory is driven by a 32-bit microprocessor, the predetermined size corresponds to 4 words (16 bytes).

In a conventional information processing apparatus, a microprocessor can access only one word in the cache memory at a time. For this reason, an application, e.g., in which a plurality of arbitrary words are simultaneously accessed to increase a processing speed, cannot be performed, thus preventing high-speed processing.

SUMMARY OF THE INVENTION

It is an object of the present invention to provide an information processing apparatus which allows a read operation of a plurality of data from a cache memory upon one access, thus realizing high-speed processing.

In order to achieve the above object, according to the first aspect of the present invention, there is provided an information processing apparatus, comprising: first memory for storing a large amount of data in units of data blocks each having a predetermined size, the first memory storing a plurality of data blocks, each of the data blocks including a plurality of subblocks, and each of the subblocks including a plurality of byte data; a second memory for storing a small amount of data as compared with that of the first memory to perform high-speed processing, the second memory transferring data to/from the first memory in units of data blocks; address generating means for generating desired data block and subblock addresses to access a plurality of desired subblocks in a desired data block in the second memory; determining means for determining whether a data block corresponding to the data block address generated by the address generating means is present in the second memory; and first reading means for reading a plurality of subblocks corresponding to the subblock addresses in the subblocks in the corresponding data block from the second memory when the determining means determines that the corresponding data block is present in the second memory.

In order to achieve the above object, according to the second aspect of the present invention, there is provided an information processing apparatus, comprising: a first memory for storing a large amount of data in units of data blocks each having a predetermined size, said first memory storing a plurality of data blocks, each of said data blocks including a plurality of subblocks, and each of said subblocks including a plurality of byte data; a second memory for storing a small amount of data as compared with that of said first memory to perform high-speed processing, said second memory transferring data to/from said first memory in units of data blocks; address generating means for generating desired data block and subblock addresses to access a plurality of desired subblocks in a plurality of desired data blocks in said second memory; determining means for determining whether all data blocks corresponding to said plurality of data block addresses generated by said address generating means are present in said second memory; and first reading means for reading a plurality of subblocks corresponding to the subblock addresses in said subblocks in the corresponding data blocks from said second memory when said determining means determines that all of said corresponding data blocks are present in the second memory.

BRIEF DESCRIPTION OF THE DRAWINGS

FIG. 2 is a view showing a detailed arrangement of a cache memory shown in FIG. 1;

DETAILED DESCRIPTION OF THE PREFERRED EMBODIMENTS

Figure 1:
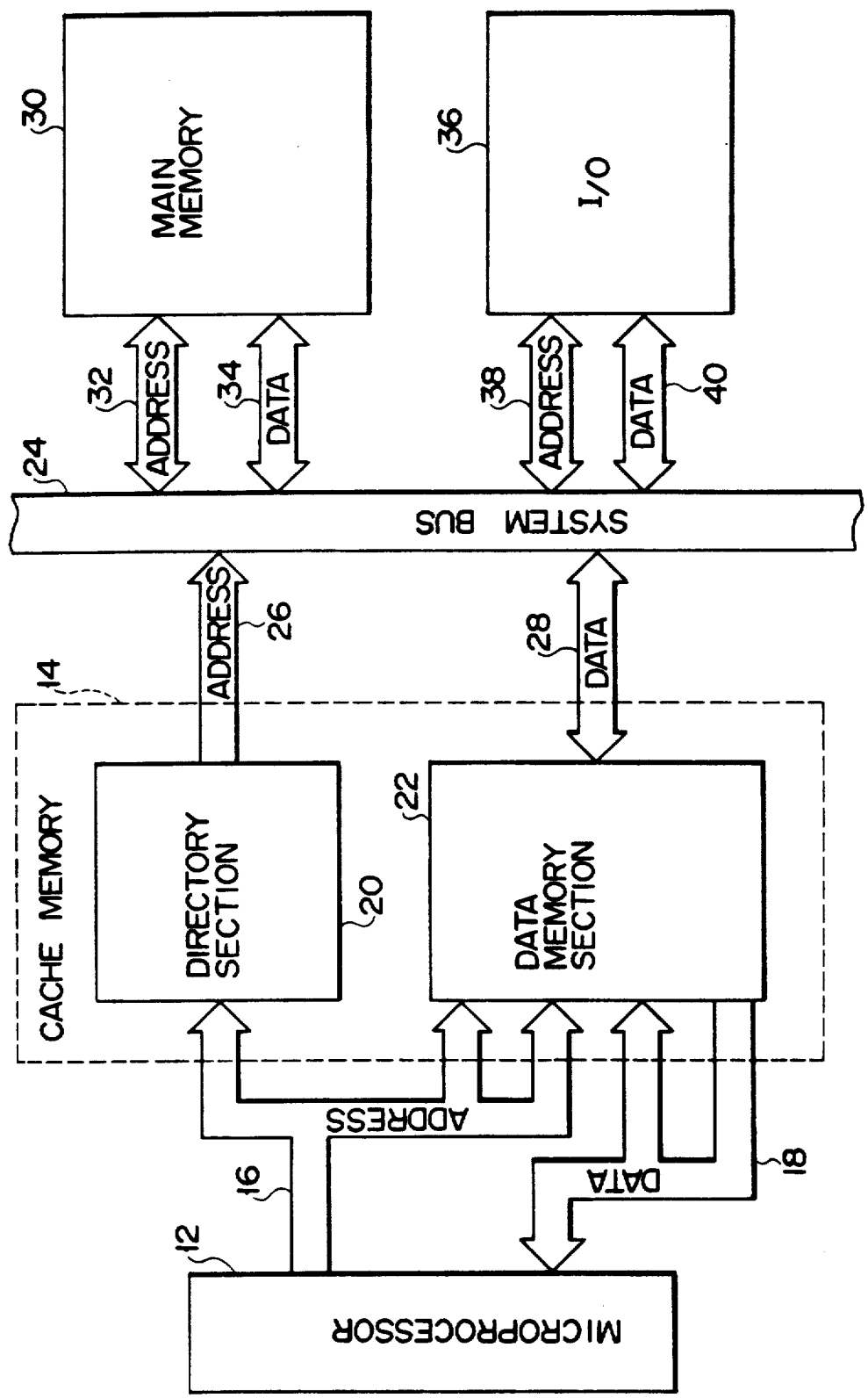
FIG. 1 is a schematic block diagram of an information processing apparatus according to the present invention.

FIG. 1 is a schematic block diagram of an information processing apparatus according to the present invention. FIG. 1 illustrates a microprocessor system using a cache memory. FIG. 2 is a view showing a detailed arrangement of the cache memory shown in FIG. 1.

As shown in FIG. 1, a microprocessor 12 is connected to a cache memory 14 through address and data buses 16 and 18. The memory 14 includes a directory section 20 and a data memory section 22. The memory 14 is connected to a system bus 24 through address and data buses 26 and 28. A main memory 30 is connected to the system bus 24 through address and data buses 32 and 34. In addition, an I/O unit 36 is connected to the system bus 24 through address and data buses 38 and 40.

The memory space in the main memory 30 is divided into units each having a predetermined size, and the divided areas are to be referred to as "blocks" hereinafter. Data stored in these blocks are to be referred to as "data blocks" hereinafter. The contents of the main memory 30 are stored in the cache memory 14 in units of data blocks. The contents of the cache memory 14 are returned to the main memory 30 in units of blocks.

These blocks have block numbers corresponding to addresses of the main memory 30, respectively. These block numbers are to be referred to as "tag information" hereinafter. When the blocks in the main memory 30 are mapped on the cache memory 14, the data block in each block is stored in the data memory section 22 in the cache memory 14.

As shown in FIG. 2, the directory section 20 in the cache memory 14 includes a tag information portion 42, a tag valid bit portion 44, and a comparator 46. The tag information portion 42 stores the tag information. The tag valid bit portion 44 stores valid bits representing the validity of the tag information.

With the above arrangement, data access is performed by the microprocessor 12 in the following manner.

In FIG. 2, the microprocessor 12 inputs address information of required data including data block and word addresses (to be described later) to the cache memory 14 through the address bus 16. The cache memory 14 retrieves tag information stored in the tag information portion 42 on the basis of the address data. The above retrieval operation is performed by comparing the address output from the microprocessor 12 to the address bus 16 with the tag information output from the tag information portion 42 by the comparator 46. The retrieval result can be obtained by a hit/mishit output 48 from the comparator 46. The hit/mishit output 48 is supplied to the microprocessor 12 (not shown).

When the tag information which coincides with the address information is present in the tag information portion 42, this is determined as a "hit", and the microprocessor 12 accesses the corresponding data. In contrast to this, when the tag information which coincides with the address information is not present in the tag information portion 42, this is determined as a "mishit". In this case, the data requested by the microprocessor 12 is not present in the cache memory 14. In this case, the microprocessor 12 performs trapping processing to store the requested data stored in the block in the main memory 30 in an empty block in the cache memory 14 (data memory section 22). At this time, when no empty block is present in the cache memory 14 (data memory section 22), the microprocessor 12 returns nonrequested data from the block which stores this data among the blocks in the cache memory 14 (data memory section 22) to the main memory 30, thus obtaining an empty block. Data in the requested block is transferred from the main memory 30 to the empty block, and is stored in the empty block.

The blocks in the main memory 30 are assigned in the cache memory 14 by a known method such as a full associative system, a direct mapping system, or a set associative system. In this case, the direct mapping system is exemplified and will be described below. In the direct mapping system, the blocks on the main memory 30 are mapped in specific blocks in the cache memory 14.

Figure 3:
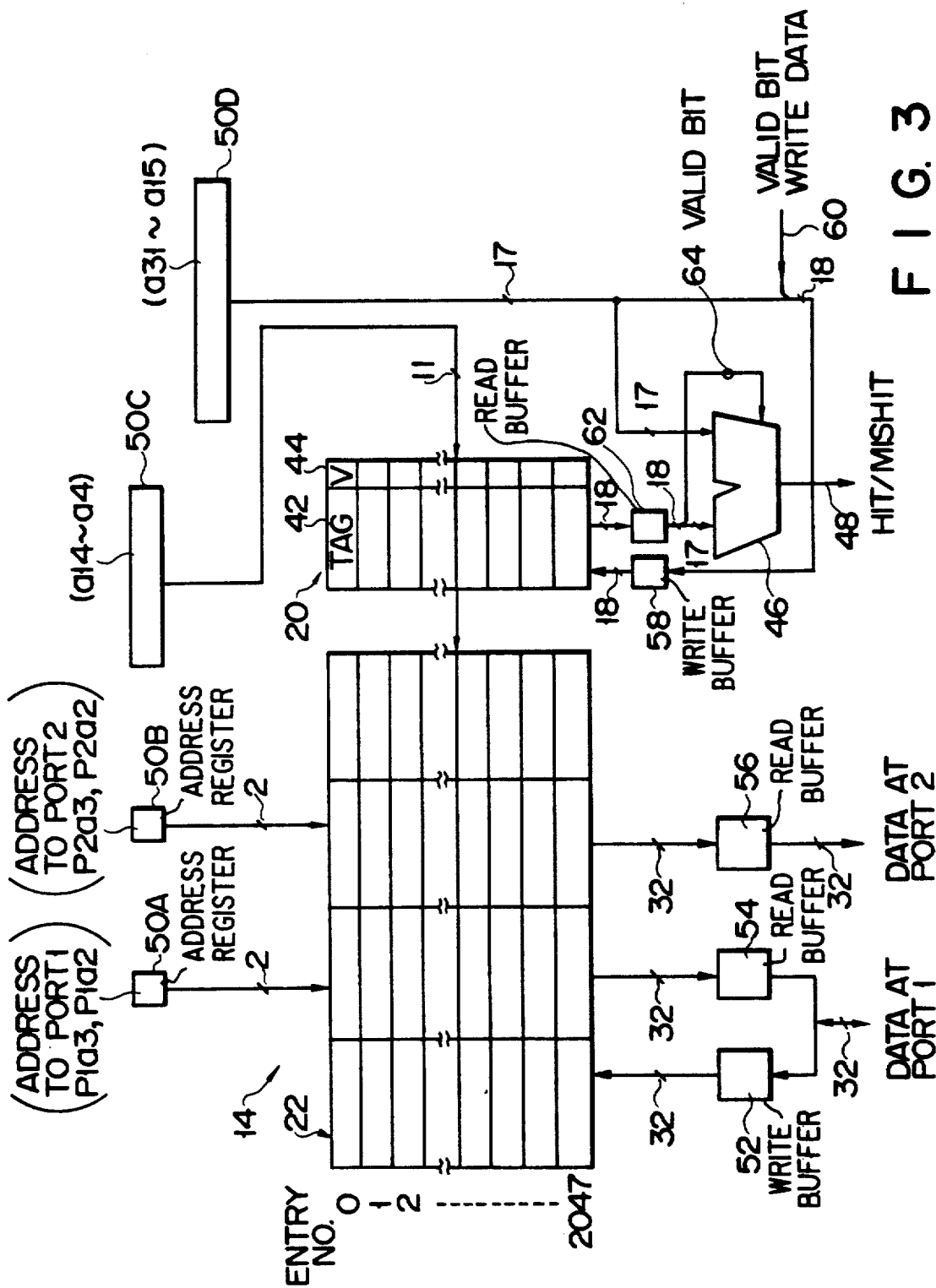
FIG. 3 is a block diagram of an information processing apparatus using a 32-bit microprocessor according to the first embodiment of the present invention.

FIG. 3 is a block diagram according to the first embodiment of the present invention, in which the cache memory of the direct mapping system driven by a 32-bit microprocessor is used. In particular, in this embodiment, a dual port memory is used as the cache memory 14. The microprocessor 12 includes address registers 50A, 50B, 50C, and 50D which store request addresses to be supplied to the cache memory 14. Assume that addresses a31 to a0 stored in these address registers 50A, 50B, 50C, and 50D are byte addresses. In this case, since one word consists of 32 bits, the upper 30 bits a31 to a2 of the address are used to access the word, and the lower two bits a1 and a0 designate on of four byte data which constitute one word. In particular, the addresses a3 and a2 of the upper 30 bits a31 to a2 are defined as P1a3 and P1a2, and P2a3 and P2a2, respectively. These addresses are supplied to both ports of the dual port data memory section, respectively. In the arrangement shown in FIG. 3, therefore, two words in one data block can be simultaneously accessed. Note that one data block in the data memory section 22 consists of four words (16 bytes), and one data block in the directory section 20 consists of 18 bits (17 bits for tag information, and 1 bit for a valid bit). In other words, the data block size corresponds to four words (four subblocks). The entry number of the blocks is $2^{11} = 2,048$.

The addresses P1a3 and P1a2 to a port 1 in the data memory section 22 are set in the address register 50A as a word address. The addresses P2a3 and P2a2 to a port 2 in the data memory section 22 are set in the address register 50B as a word address. The addresses a14 to a4 which designate an entry number of a block to be supplied to the directory section 20 are set in the address register 50C as a tag address included in the data block address. The addresses a31 to a15 to be supplied to the comparator 46 are set in the address register 50D as address data included in the data block address.

Data is written in the port 1 of the data memory section 22 through a write buffer 52, and data at the port 1 of the data memory section 22 is read out through a read buffer 54. In addition, data at the port 2 in the data memory section 22 is read out through a read buffer 56.

On the other hand, valid bit write data 60 is written in the directory section 20 through a write buffer 58. At this time, the valid bit write data 60 is also supplied to the tag information portion 42 in the directory section 20 through the write buffer 58 together with the data corresponding to the addresses a31 to a15 set in the address register 50D as a total of 18-bit data. Data in the directory section 20 is read out through a read buffer 62.

Of the data read out from the directory section 20, the data from the tag valid bit portion 44 is fetched as a valid bit 64, and is supplied to the comparator 46.

With the above arrangement, an operation performed when data is read out from the cache memory 14 by the microprocessor 12 will be described hereinafter.

The microprocessor 12 sets a common address corresponding to the addresses a31 to a4 in the address registers 50C and 50D as addresses to designate two words. These set addresses a31 to a4 are input to the directory section 20 in the cache memory 14 through the address bus 16. In addition, the microprocessor 12 sets the addresses P1a3 and P1a2, and P2a3 and P2a2 which designate the port of the data memory section 22 in the address registers 50A and 50B, respectively. These set addresses P1a3 and P1a2, and P2a3 and P2a2 are input to the data memory section 22 in the cache memory 14 through the address bus 16. In the data memory section 22 having a dual port arrangement, the data at the port 1 is designated by the addresses P1a3 and P1a2, and the data at the port 2 is designated by the addresses P2a3 and P2a2.

The 17-bit tag information and valid 1 bit in the block having the entry number designated by the addresses a14 to a4 are read through the buffer 62. In addition, one word of the four words included in the block having the designated entry number is designated by the addresses P1a3 and P1a2, and the 32-bit data of the designated one word is read through the buffer 54. Furthermore, another word of the four words included in the block having the designated entry number is designated by the addresses P2a3 and P2a2, and 32-bit data of the designated one word is read through the buffer 56. In other words, two words which can be simultaneously read are limited to the words in a single block.

The comparator 46 compares the addresses a31 to a15 supplied from the address register 50D with the read 17-bit tag information. If the comparison result indicates a "coincidence", and the read valid bit 64 is set at "1", i.e., valid, a "hit" is determined. The microprocessor 12 uses the read data on the basis of the hit/mishit output 48 from the comparator 46. In contrast to this, if the comparison result indicates a "noncoincidence" or the valid bit 64 is set at "0", a "mishit" is determined. For this reason, the microprocessor 12 starts the above-mentioned trapping processing on the basis of the hit/mishit output 48 from the comparator 46. After this trapping processing is completed, the required data is accessed again.

Figure 4:
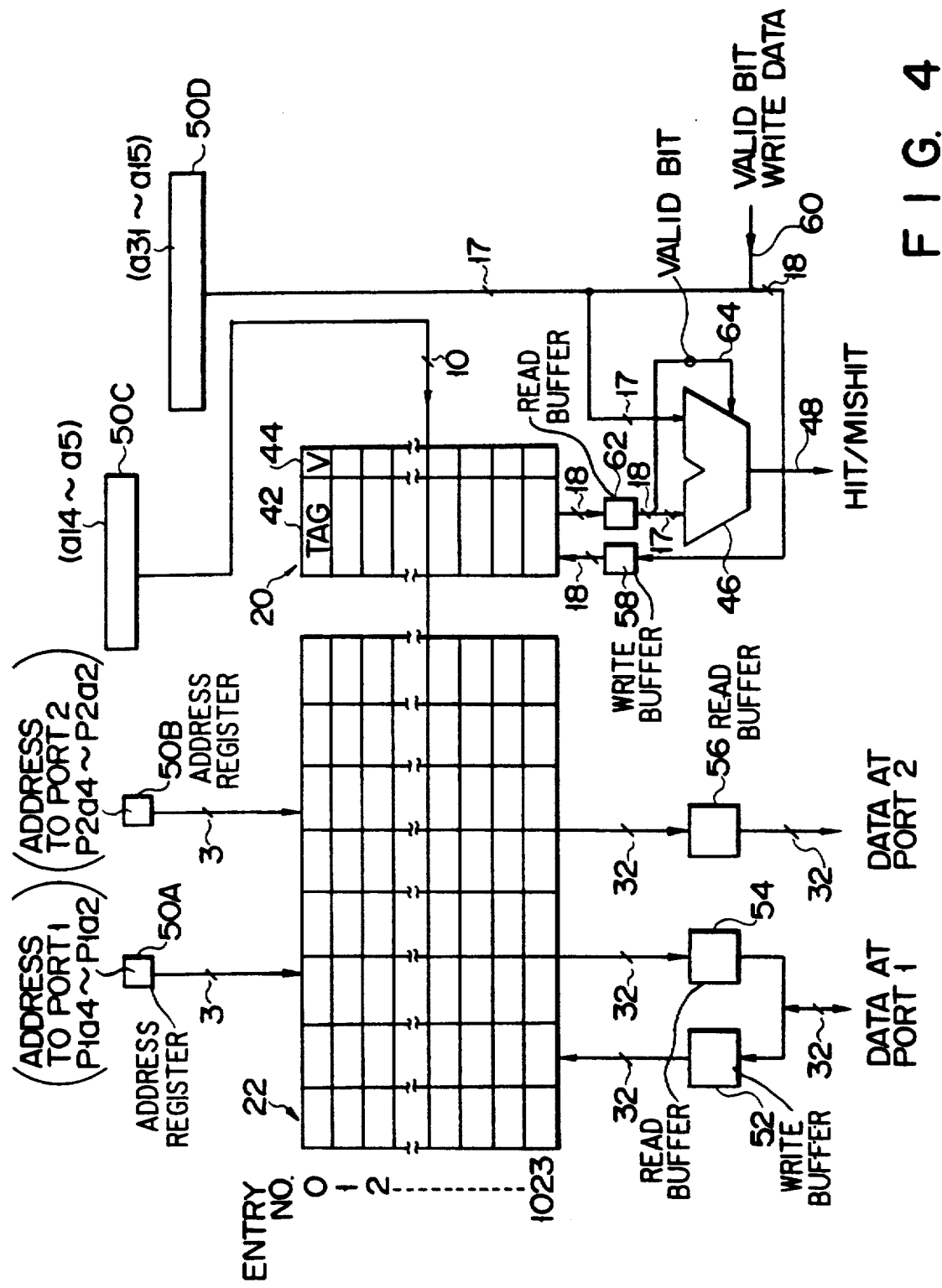
FIG. 4 is a block diagram of an information processing apparatus using a 32-bit microprocessor according to the second embodiment of the present invention.

FIG. 4 is a block diagram showing an arrangement of an information processing apparatus according to the second embodiment of the present invention. In the data memory section 22 in the first embodiment, 2,048 entries are grouped such that one block consists of four words. However, in a data memory section 22 in the second embodiment, 1,024 entries are grouped such that one block consists of eight words. An address register 50A supplies addresses Pla4 to Pla2 to a port 1 in the data memory section 22, and an address register 50B supplies addresses P2a4 to P2a2 to a port 2 in the data memory section 22. An address register 50C supplies addresses a14 to a5 which designate the entry numbers of the blocks to a directory section 20.

In the above first embodiment, the number of words which ca be simultaneously read is two of four words. However, according to the arrangement of the second embodiment, two words of eight words can be simultaneously read. This allows an increase in the degree of freedom of the program.

Thus, in the first and second embodiments, the data memory section 22 has two read ports and one write port. Although read and write operations cannot be simultaneously performed, arbitrary two data in a single block can be simultaneously read. Therefore, high-speed processing of the information processing apparatus can be realized.

A cache memory 14 may have three or more output ports. In this case, words corresponding in number to the ports can be read out.

Figure 5:
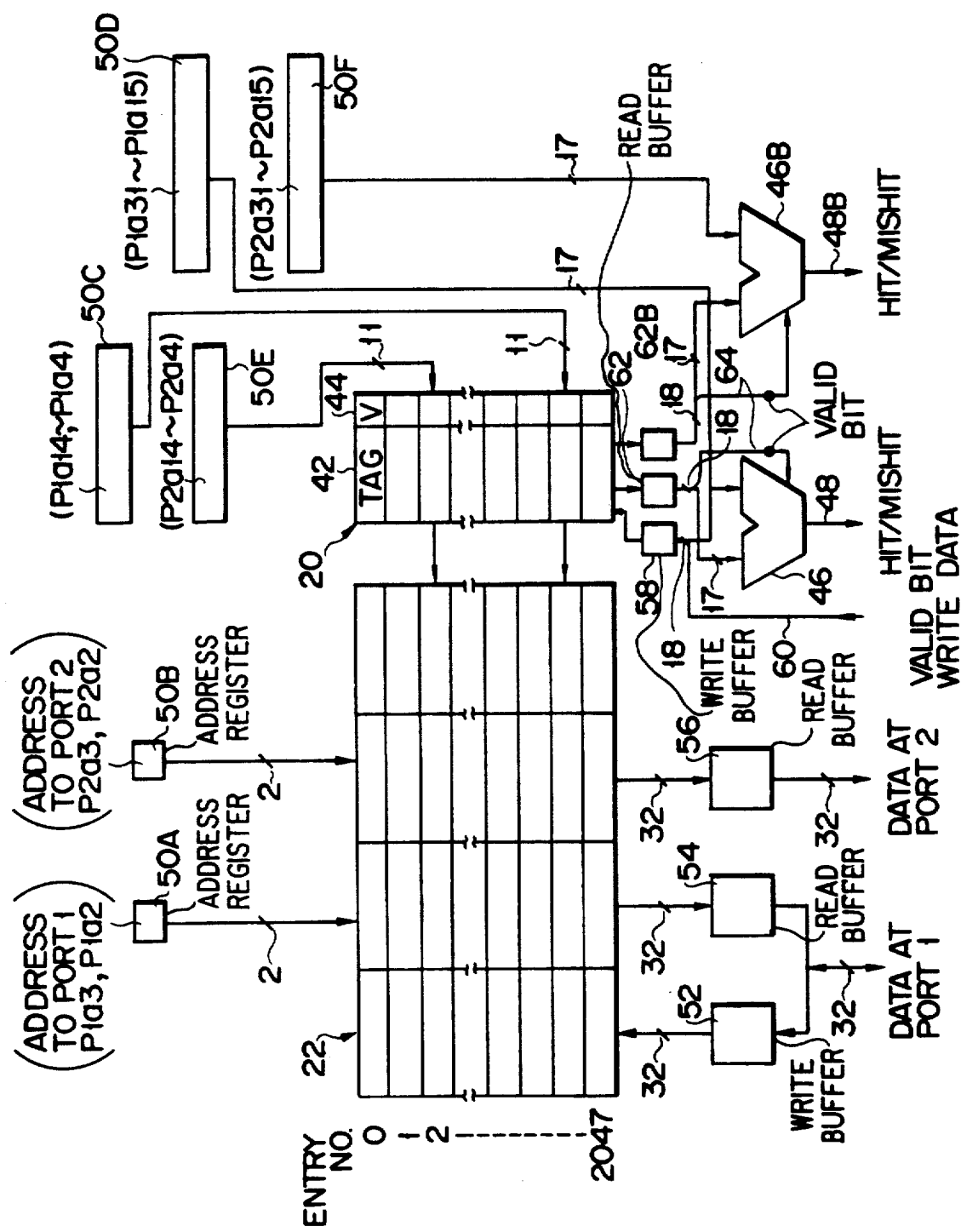
FIG. 5 is a block diagram of an information processing apparatus using a 32-bit microprocessor according to the third embodiment of the present invention.

FIG. 5 is a block diagram showing an arrangement of an information processing apparatus according to the third embodiment of the present invention. The data memory section 22 in the first and second embodiments includes two read ports. However, in the third embodiment, not only a data memory section 22, but also a directory section 20 includes two read ports. An address register 50C supplies addresses Pla14 to Pla4 to a port 1 in the directory section 20, and an address register 50E supplies addresses P2a14 to P2a4 to a port 2 in the directory section 20. An address register 50D supplies addresses Pla31 to Pla15 to the port 1 to a comparator 46, and an address register 50F supplies addresses P2a31 to P2a15 to the port 2 to a comparator 46B. The comparator 46B receives the data from the port 2 in the directory section 20 through a read buffer 62B to output a hit/mishit output 48B.

With the above arrangement, in the information processing apparatus in the third embodiment, words which can be simultaneously read are not limited to those in a single block, and words in arbitrary blocks can be selected and read. In this case, two comparators 68 and 68B are operated to detect a cache error. This is because a microprocessor 12 determines a "hit" only when both the data which are simultaneously read are present in a cache memory 14, and both the hit/mishit outputs 48 and 48B are "1". When at least one of the hit/mishit outputs 48 and 48B is "0", the microprocessor 12 performs trapping processing such as replacement.

Also in the third embodiment, when the cache memory 14 having three or more output ports is used, words corresponding in number to the ports can be read out.

Figure 6:
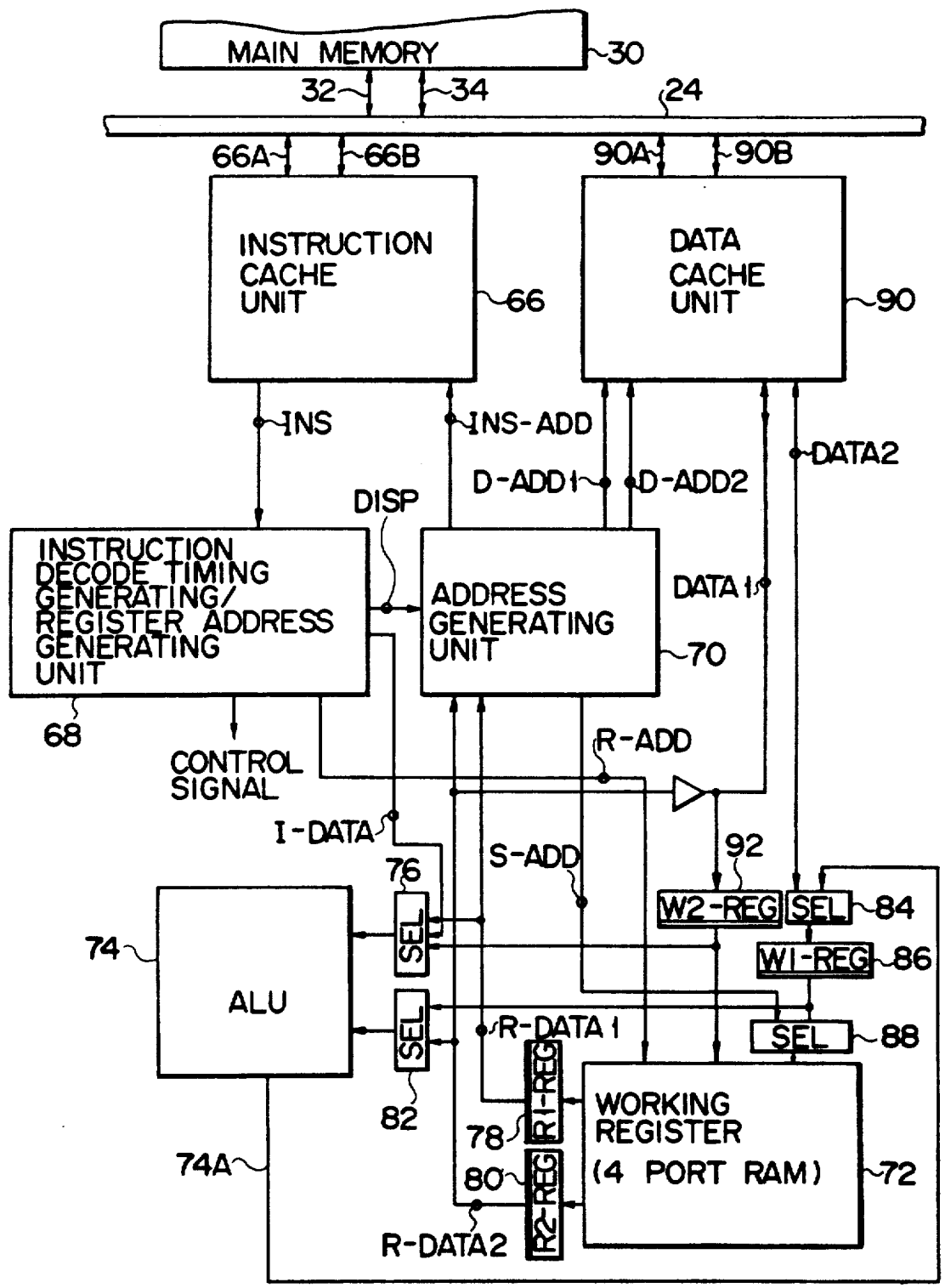
FIG. 6 is a block diagram for explaining processing of the 32-bit microprocessor for driving a cache memory shown in FIGS. 3 to 5.

FIG. 6 is a block diagram for explaining processing of the 32-bit microprocessor applied to the embodiments of the present invention shown in FIGS. 3 to 5. In FIG. 6, the cache memory 14 is divided into data and instruction cache units, and only the data cache unit has the arrangement shown in FIGS. 3 to 5. Note that the instruction cache unit can have the same arrangement as that of the data cache unit, as a matter of course.

An instruction cache unit 66 is connected to the system bus 24 through data and address buses 66A and 66B, and supplies an instruction (INS) to an instruction decode timing generating/register address generating unit 68. The instruction decode timing generating/register address generating unit 68 generates a control signal, and supplies a displacement (DISP) for relative jump of a program counter to an address generating unit 70. The instruction decode timing generating/register address generating unit 68 also supplies a register address (R-ADD) to a working register 72, and supplies immediate data (I-DATA) to an arithmetic and logic unit (ALU) 74 through a selector (SEL) 76.

The working register 72 supplies first and second register data (R-DATA1 and R-DATA2) to the address generating unit 70 through read registers (R1-REG) 78 and (R2-REG) 80, respectively. These first and second register data are also supplied to the arithmetic and logic unit 74 through selectors 76 and 82, respectively. An arithmetic bus 74A from the arithmetic and logic unit 74 is connected to the working register 72 through a selector 84, a write register (W1-REG) 86 and a selector 88. An output from the write register 86 is supplied to the arithmetic and logic unit 74 through the selector 82.

The second register data from the working register 72 is supplied to a data cache unit 90 as first data (DATA1) through a write register (W2-REG) 92. The output terminal of the write register 92 is also connected to the arithmetic and logic unit 74 through the selector 76.

An instruction address (INS-ADD) from the address generating unit 70 is supplied to the instruction cache unit 66, and the first and second data addresses (D-ADD1 and D-ADD2) are supplied to the data cache unit 90. A save address (S-ADD) is supplied from the address generating unit 70 to the working register 72 through the selector 88.

The data cache unit 90 is connected to the system bus 24 through data and address buses 90A and 90B. The data cache unit 90 supplies second data (DATA2) to the write register 86 through the selector 84.

With the above arrangement, if two words can be simultaneously written in the working register 72, two data in the data cache unit 90 can be read by one access, and the read data can be supplied to the arithmetic and logic unit 74 as source data to perform an arithmetic operation, or to be written in the working register 72.

One of the cache memories in the above first to third embodiments can be formed on a single semiconductor chip together with the microprocessor.

As described above, according to the present invention, only one access is required to read two words although two accesses are required to read two words in the conventional apparatus. Therefore, a processing speed can be greatly increased. More specifically, when the dual port memory is sued as a cache memory, two words can be simultaneously accessed, thus greatly increasing a processing speed. When the memory which has the ports corresponding in number to the words is used as the cache memory, three or more words can be read by one access.

What is claimed is:

1. An information processing apparatus, comprising:
   a first memory for storing a large amount of data in units of data blocks each having a predetermined size, said first memory storing a plurality of data blocks, each of said data blocks including a plurality of data subblocks, and each of said data subblocks including a plurality of byte data;
   a second memory, coupled to said first memory so as to transfer data to/from said first memory in units of data blocks, for storing a predetermined number of data blocks to perform high-speed processing;
   address generating means for simultaneously generating a data block address corresponding to a desired data block, and a plurality of data subblock addresses corresponding to a plurality of desired data subblocks to be accessed from said second memory, said data block address being common to each of said plurality of data subblock addresses;
   determining means for receiving said data block address generating by said address generating means and for determining whether the desired data block is present in said second memory;
   first reading means, connected to said second memory and said determining means, for simultaneously reading said plurality of desired data subblocks corresponding to the data subblock addresses of said desired data subblocks included in the desired data block from said second memory when said determining means determines that said desired data block is present in said second memory;
   transferring means for, when said determining means determines that the desired data block is not present in said second memory, transferring the desired data block from said first memory to said second memory;
   second reading means for simultaneously reading said plurality of desired data subblocks corresponding to the data subblock addresses of said desired data subblocks included in said desired data block after the transfer of the desired data block by said transferring means; and
   wherein said second memory includes a plurality of address input ports and a plurality of data output ports, the number of said address input ports corresponding to the number of desired data subblocks and the number of said data output ports corresponding to the number of desired data subblocks.

2. The information processing apparatus according to claim 1, wherein said address generating means includes a first register for storing said generated data block address, and a plurality of second registers for respectively storing said plurality of data subblock addresses, the data block address stored in said first register being supplied to said determining means, and the plurality of data subblock addresses stored in said plurality of second registers being supplied to respective address input ports in said second memory.

3. The information processing apparatus according to claim 2, wherein said determining means includes tag information storing means for storing tag information representing correspondence between each data block stored in said second memory and the corresponding data block stored in said first memory,
   the data block address stored in said first register includes a tag address representing an address of said tag information storing means, said data block address being supplied to said tag information storing means for reading of the tag information, and address data corresponding to tag information to be read from said tag information storing means in accordance with said tag address, and
   said first register includes a first subregister for storing the tag address, and a second subregister for storing the address data.

4. The information processing apparatus according to claim 3, wherein said determining means further includes comparing means for comparing the tag information read from said tag information storing means in accordance with the tag address stored in said first subregister with the address data stored in said second subregister.

5. The information processing apparatus according to claim 4, wherein said first reading means includes means for reading a plurality of data subblocks corresponding to the plurality of data subblock addresses stored in said plurality of second registers in the data block in said second memory corresponding to the tag address stored in said first subregister from said second memory.

6. An information processing apparatus, comprising:
   a first memory for storing a large amount of data in units of data blocks each having a predetermined size, said first memory storing a plurality of data blocks, each of said data blocks including a plurality of data subblocks, and each of said data subblocks including a plurality of byte data;
   a second memory, coupled to said first memory so as to transfer data to/from said first memory in units of data blocks, for storing a predetermined number of data blocks to perform high-speed processing;
   address generating means for simultaneously generating a plurality of data block addresses corresponding to a plurality of desired data blocks, and a plurality of data subblock addresses corresponding to a plurality of desired data subblocks, each of said data block addresses being common to two or more of said data subblock addresses, said address generating means simultaneously generating said data block and subblock addresses in order to access said plurality of desired data subblocks included in said plurality of desired data blocks from said second memory;
   determining means for receiving said data block addresses generated by said address generating means and for determining whether all desired data blocks are present in said second memory;
   first reading means, connected to said second memory and said determining means, for simultaneously reading said plurality of desired data subblocks from said second memory when said determining means determines that all of said desired data blocks are present in said second memory;

transferring means for, when said determining means determines that one of said desired data blocks is not present in said second memory, transferring said one of said desired data blocks from said first memory to said second memory;

second reading means for simultaneously reading said plurality of desired data subblocks corresponding to the data subblock address after the transfer of the desired data block determined to be not present in said second memory; and wherein said second memory includes address input ports and data output ports, the number of address input ports corresponding to the number of desired data subblocks, and the number of data output ports corresponding to the number of desired data subblocks.

7. The information processing apparatus according to claim 6, wherein said address generating means includes a plurality of first registers for storing said plurality of generated data block addresses, and a plurality of second registers for respectively storing a plurality of data subblock addresses, the plurality of data block addresses stored in said plurality of first registers being supplied to said determining means, and plurality of data subblock addresses stored of said plurality of second registers being supplied to the respective address input ports in said second memory.

8. The information processing apparatus according to claim 11, wherein said determining means includes tag information storing means for storing tag information representing correspondence between each data block stored in said second memory and the corresponding data block stored in said first memory, the data block address stored in said plurality of first registers includes a tag address representing an address of said tag information storing means, said data block address being supplied to said tag information storing means for reading of the tag information, and address data corresponding to tag information to be read from said tag information storing means in accordance with said tag address, and said plurality of first registers respectively include a plurality of first subregisters for storing the tag addresses, and a plurality of second subregisters for storing the address data.

9. The information processing apparatus according to claim 8, wherein said determining means further includes a plurality of comparing means for respectively comparing the tag information read from said tag information storing means in accordance with the tag addresses stored in said plurality of first subregisters with the address data stored in said plurality of second subregisters.

10. The information processing apparatus according to claim 9, wherein said first reading means includes means for reading a plurality of data subblocks corresponding to the plurality of data subblock addresses stored in said plurality of second registers in the data block in said second memory corresponding to the tag address stored in said plurality of first subregisters from said second memory.

11. An information processing apparatus, comprising:
a main memory for storing a large amount of data in units of data blocks each having a predetermined size, said main memory storing a plurality of data blocks, each of said data blocks including a plurality of data subblocks, and each of said data subblocks including a plurality of byte data;

a cache memory, coupled to said main memory so as to transfer data to/from said main memory in units of data blocks, for storing a predetermined number of data blocks to perform high-speed processing;

a CPU for simultaneously generating a data block address corresponding to a desired data block, and a plurality of data subblock addresses corresponding to a plurality of desired data subblocks to be accessed from said cache memory, said data block address being common to each of said plurality of data subblock addresses;

determining means for receiving said data block address generating by said CPU and for determining whether the desired data block is present in said cache memory;

first reading means, connected to said cache memory and said determining means, for simultaneously reading said plurality of desired data subblocks corresponding to the data subblock addresses of said desired data subblocks included in the desired data block from said cache memory and for supplying said read plurality of desired data subblocks to said CPU when said determining means determines that said desired data block is present in said cache memory;

transferring means for, when said determining means determines that the desired data block is not present in said cache memory, transferring the desired data block from said main memory to said cache memory; and second reading means for simultaneously reading said plurality of desired data subblocks corresponding to the data subblock addresses of said desired data subblocks included in said desired data block in said cache memory after the transfer of the desired data block by said transferring means and for supplying said read plurality of desired data subblocks to said CPU, and wherein said cache memory includes a plurality of address input ports and a plurality of data output ports, the number of said address input ports corresponding to the number of desired data subblocks and the number of said data output ports corresponding to the number of desired data subblocks.

12. The information processing apparatus according to claim 11, wherein a plurality of non-consecutive subblock addresses are output from said CPU to said cache memory and a plurality of data corresponding to the non-consecutive subblock addresses are simultaneously input to said CPU.

13. The information processing apparatus according to claim 12, wherein a plurality of desired data subblocks corresponding to a plurality of subblock addresses is input to said cache memory from said main memory when said plurality of desired data subblocks are not located in said cache memory.

14. An information processing apparatus, comprising:
a main memory for storing a large amount of data in units of data blocks each having a predetermined size, said main memory storing a plurality of data blocks, each of said data blocks including a plurality of data subblocks, and each of said data subblocks including a plurality of byte data;

a cache memory, coupled to said main memory so as to transfer data to/from said main memory in units of data blocks, for storing a predetermined number of data blocks to perform high-speed processing;

a CPU for simultaneously generating a plurality of data block addresses corresponding to a plurality of desired data blocks, and a plurality of data subblock addresses corresponding to a plurality of desired data subblocks, each of said data block addresses being common to two or more of said data subblock addresses in the same block address, said CPU simultaneously generating said data block and subblock addresses in order to access said plurality of desired data subblocks included in said plurality of desired data blocks from said cache memory;

determining means for receiving said data block addresses generated by said CPU and for determining whether all desired data blocks are present in said cache memory;

first reading means, connected to said cache memory and said determining means, for simultaneously reading said plurality of desired data subblocks from said cache memory and for supplying said read plurality of desired data subblocks to said CPU when said determining means determines that all of said desired data blocks are present in said cache memory;

transferring means for, when said determining means determines that one of said desired data blocks is not present in said cache memory, transferring said one of said desired data blocks from said main memory to said cache memory; and second reading means for simultaneously reading said plurality of desired data subblocks corresponding to the data subblock address after the transfer of the desired data block determined not to be present in said cache memory and for supplying said read plurality of desired data subblocks to said CPU, and wherein said cache memory includes address input ports and data output ports, the number of address input ports corresponding to the number of desired data subblocks, and the number of data output ports corresponding to the number of desired data subblocks.

15. The information processing apparatus according to claim 18, wherein a plurality of non-consecutive subblock addresses are output from said CPU to said cache memory and a plurality of data corresponding to the non-consecutive subblock addresses are simultaneously input to the CPU.

16. The information processing apparatus according to claim 15, wherein a plurality of desired data subblocks corresponding to a plurality of subblock addresses is input to said cache memory from said main memory when said plurality of desired data subblocks are not located in said cache memory.

* * * * *